United States Patent [19]

McNaughton et al.

[11] Patent Number: 4,553,813

[45] Date of Patent: Nov. 19, 1985

[54] FIBER OPTIC CONNECTOR SYSTEM FOR INTEGRATED CIRCUIT MODULES

[75] Inventors: James L. McNaughton, Hyannis, Mass.; James R. Petrozello, Endicott, N.Y.

[73] Assignee: International Business Machines Corporation, Armonk, N.Y.

[21] Appl. No.: 494,760

[22] Filed: May 16, 1983

[51] Int. Cl.⁴ .............................................. G02B 7/26
[52] U.S. Cl. .................................. 350/96.20; 357/74; 357/75
[58] Field of Search ............... 350/96.20, 96.21, 96.22; 357/17, 18, 30, 74, 75; 250/227

[56] References Cited

U.S. PATENT DOCUMENTS

| | | | |
|---|---|---|---|
| 3,806,225 | 4/1974 | Codrino | 350/96.20 |
| 4,167,303 | 9/1979 | Bowen et al. | 350/96.21 |
| 4,182,545 | 1/1980 | Greer | 350/96.20 |
| 4,346,294 | 8/1982 | Albaugh et al. | 250/227 |
| 4,439,006 | 3/1984 | Stevenson | 350/96.20 |
| 4,466,009 | 8/1984 | Konishi et al. | 357/30 |

FOREIGN PATENT DOCUMENTS

| | | | |
|---|---|---|---|
| 165109 | 12/1981 | Japan | 360/96.20 |
| 18612 | 2/1983 | Japan | 350/96.22 |
| 58-510 | 4/1983 | Japan | 350/96.21 |

OTHER PUBLICATIONS

Cefarelli et al., *IBM Tech. Discl. Bull.*, vol. 21, No. 4, Sep. 1978, "Optical Circuit Module Connector," pp. 1568-1570.

*Primary Examiner*—William L. Sikes
*Assistant Examiner*—Frank González
*Attorney, Agent, or Firm*—John H. Bouchard; Gerald R. Gugger

[57] ABSTRACT

A fiber optic module connector system comprising a quick connect and disconnect optical terminator having several signal channels and an optically terminated module with a built-in retention system for its mating connector. Fiber optic signal lines are rapidly connected directly to light emitting diodes mounted on an integrated circuit chip in the module.

2 Claims, 7 Drawing Figures

FIBER OPTIC CONNECTOR SYSTEM FOR INTEGRATED CIRCUIT MODULES

BACKGROUND OF THE INVENTION

In integrated circuit technology, a circuit module is employed which comprises a ceramic substrate having on a surface thereof printed circuitry in the form of copper lines. Bonded to this surface is an integrated circuit chip. The substrate is provided with input/output (I/O) pins which solder into plated through holes of a printed circuit board. External copper wires and suitable connectors between the printed circuit board and peripheral computer equipment transmit driver voltages and input/output information signals to the chip via the I/O pins and the copper circuit lines on the module substrate. With the increased demand for noise-free, rapid signal transmission, and the need to transmit many separate signals over one line, it became desirable to find an alternate approach to the present day copper wire signal lines.

SUMMARY OF THE INVENTION

The present invention provides a connector system for rapidly connecting fiber optic signal lines directly to an integrated circuit module. The fiber optic connector system is composed of a quick connect and disconnect optical terminator comprising several signal channels and an optically terminated module with a built-in retention system for its mating connector. A connector housing is provided which contains a plurality of optical terminators with each terminator containing a fiber optic strand. A module substrate having printed circuitry on a surface thereof has at least one integrated circuit chip mounted on said surface. A plurality of light emitting diodes are mounted on the chip and the module substrate is provided with a cap which has an opening. A plurality of cones are attached to the module substrate and partially extend through the opening therein. Each cone contains a fiber optic strand which is connected to an associated one of the light emitting diodes on the chip. Quick connect and disconnect means are provided to latch the connector housing to the cap with the strands in the terminator in alignment with the strands in the cones. The fiber optic strands transmit input and output information signals between peripheral computer equipment and the integrated circuit chip. This fiber optic connector system provides the desired noise-free and rapid signal transmission and also fulfills the need to transmit many separate signals over one line. Additionally, it provides consolidation of the I/O capability at the module level in close proximity to logic chips.

Accordingly, it is a primary object of the present invention to provide a connector system for rapidly connecting fiber optic signal lines directly to an integrated circuit module.

Another object of the present invention is to provide a fiber optic connector system having a quick connect and disconnect optical terminator comprising several signal channels and an optically terminated module with a built-in retention system for its mating connector.

A still further object of the present invention is to provide a fiber optic connector system for one integrated circuit module wherein fiber optic input and output signal strands are connected to an integrated circuit chip.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
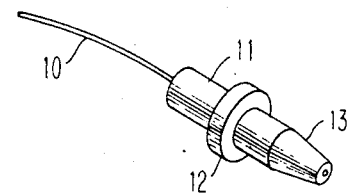
FIG. 1 is an isometric view showing an optical terminator and fiber optic strand.
Figure 3:
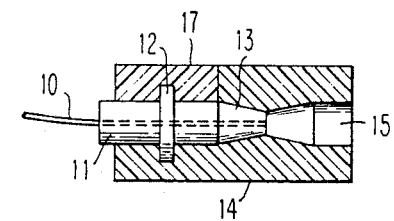
FIG. 3 is a sectional view showing the optical terminator and connector housing of FIG. 2 assembled.
Figure 2:
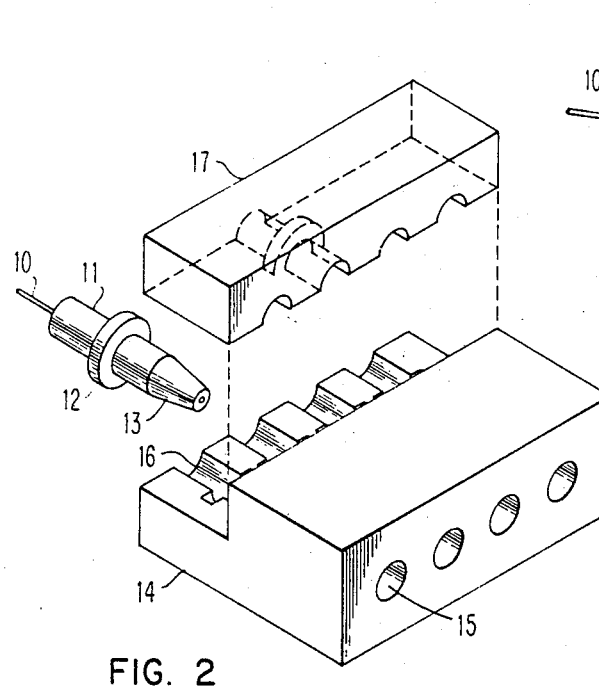
FIG. 2 is an exploded isometric view showing the optical terminator of FIG. 1 and its connector housing dis-assembled.
Figure 4:
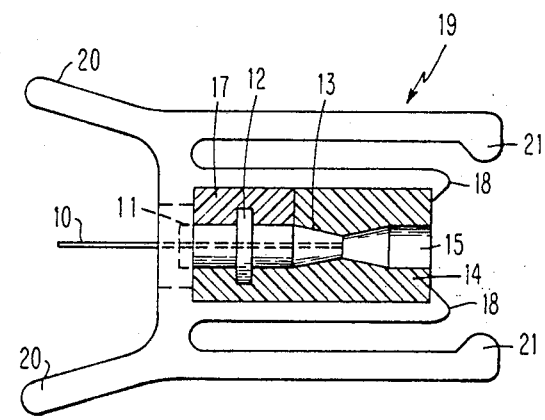
FIG. 4 is a partial sectional view showing the assembled optical terminator and connector housing of FIG. 3 mounted into a retention housing.

Referring to FIGS. 1-4, a fiber optic strand 10 is molded into a glass filled phenolic terminator 11 which incorporates a retention guide 12 and an alignment cone 13. The retention guide 12 positions the molded fiber optic terminator in an exact position in a molded glass filled polycarbonate connector housing 14 and the alignment cone 13 centers the fiber optic strand 10 in relation to the module alignment conical holes 15 so that the mating optical connectors will have proper alignment. The molded terminator 11 is ground to a precise dimension from the retention guide 12 to the tip of the alignment cone 13. The ground tip is then polished accordingly to achieve proper light transmission.

One or several of the completed optical terminators 11 are placed into a connector housing nest 16 in housing 14 and held in place by a molded glass filled polycarbonate housing cap lid 17 and the action of housing retention arms 18 located within a connector retention housing 19. The individual strands 10 are first passed through the back of the retention housing 19 before they are placed in the connector housing 14. The connector retention housing retention arms 18 snap over the edge of the connector housing 14 and retains it in place. The retention housing 19 is made of molded glass filled polycarbonate.

Figure 7:
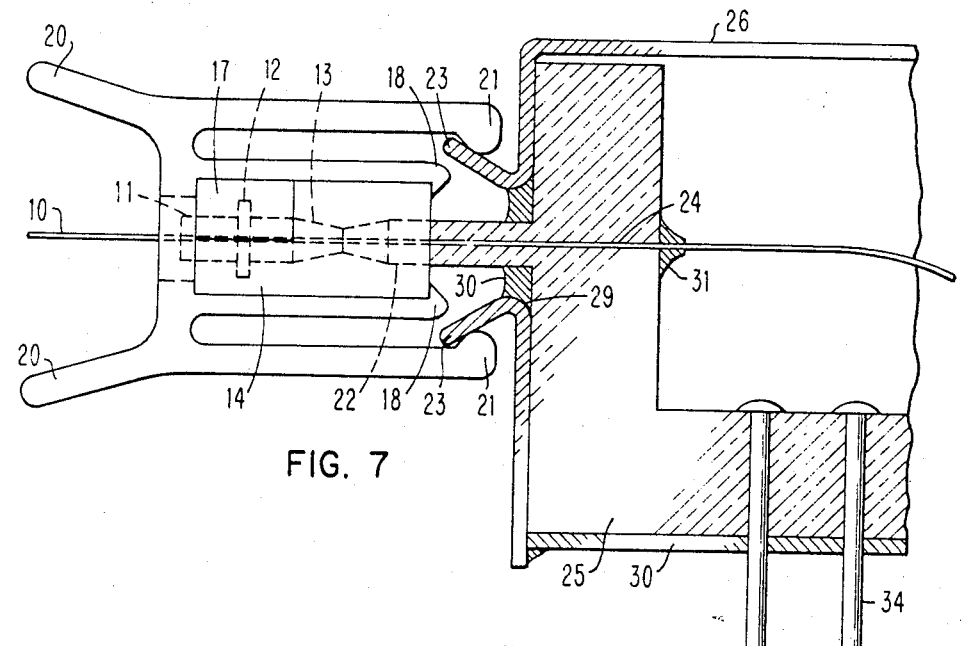
FIG. 7 is a partial sectional view showing the terminator assembly of FIG. 4 connected to the integrated circuit module of FIG. 6.
Figure 5:
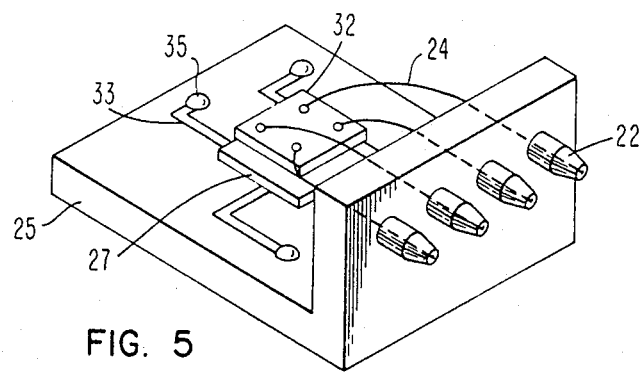
FIG. 5 is an isometric view showing fiber optical strands connected to the integrated circuit chip on the module substrate.
Figure 6:
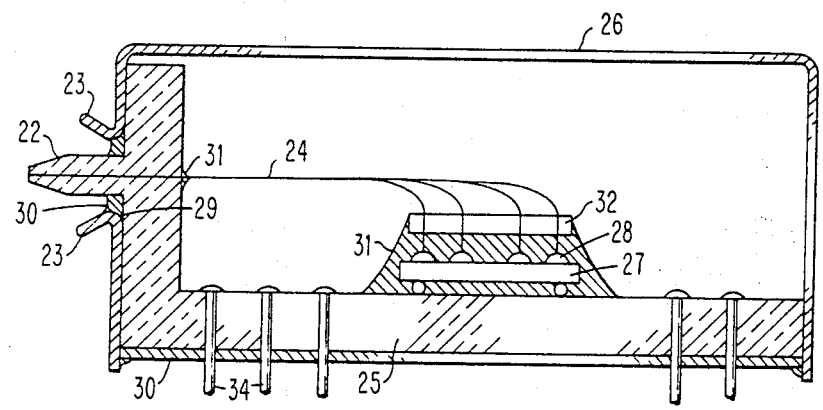
FIG. 6 is a partial sectional view showing the integrated circuit module with the chip assembly of FIG. 5.

Referring to FIGS. 5-7, finger pressure applied to the two actuation arms 20 causes the latching arms 21 to swing open allowing the device to be placed over module molded ceramic alignment cones 22 and module retention ledges 23. This now aligns and holds the mating fiber optic strands 10 and 24 to meet together in proper orientation at the ends of their respective cones.

Releasing the finger pressure allows the latching arms 21 to become engaged with the retention ledges 23 and then positively retains the connector to the module. The design of the angular surface between the latching arms 21, and the retention ledges 23 tend to drive the connector assembly towards the module by the pressure of the latch arms riding down the ramp angle of the module retention ledges. The connector is easily and quickly removed by applying finger pressure to the actuation arms, which unlatches the unit, and pulling it from the module.

The module comprises a molded ceramic substrate 25, designed for fiber optic termination, an aluminum cap 26, at least one integrated circuit chip 27, and photo transistors or photo diodes 28. The alignment cones 22 mounted in the substrate 25 house the individual optical strands 24 and align the optical module signal terminators to the connector cone alignment holes 15. The aluminum cap 26 is formed so that it supplies an opening 29 for the exit of the optical strands in their respective alignment cones 22. The cap also forms the latching edges 23 required to hold the connector and module in a mated position. A sealant 30, such as, epoxy is used at the base of the module and around the alignment cones to prevent the entrance of possible contamination. The module fiber optic strands 24 are connected by epoxy 31 into the alignment cones 22 and to the light emitting diodes 28 by means of an alignment plate 32 which accurately positions the optical strands 24 to their desired position. The assembly is then epoxied to the chip and the critical alignment of the individual strands is made easy by the alignment plate 32. After the optical channels are bonded into the alignment cones 22, they are ground off at the cone tips and polished to allow good light transmission of the signals. The aluminum cap is then placed over the module substrate and sealed in place at the base and around the protruding optical alignment cones. This sealant keeps out any hostile environment contamination.

The integrated circuits 33 which interface with the light emitting diodes 28 are mounted and processed in the normal manner and inter-connected to their respective circuit board via I/O pins 34 and plated through holes 35 as is done today in normal computer component assembly.

This fiber optic connection system for signal transmission provides direct noise free contact with modules and eliminates problems related to present day copper signal lines, such as, capacitance, contact resistance, inductance, extraneous noise pickup, etc. Also, costs are reduced because of the elimination of copper signal lines, contact pins, spring contacts, and complex circuit board laminations. Replacement or addition of the individual fiber optic strands is accomplished easily with this system as compared to repairing a copper signal line on a circuit board. Standard lengths of individual fiber optic elements can be carried in the field and box plants for engineering change repair or system upgrade.

The system utilizes glass fibers of 0.005" to 0.010" diameter strands with low light loss and a light transmittance range of 400 to 1500 nano-meters. The fiber tensile strength is 100K to 500K pounds per square inch. Typical band width capability of the fibers in this system is up to $10^9$ Hertz. One type of fiber optic strand for use in this system is made by the Corning Glass Co., such as, their low loss tele-communication type or data processing type glass fiber optic elements. Typical electro-optical components for use with the system include Hewlett-Packard light emitting diodes and Motorola photo-transistors.

Typical applications for the present invention include use in a computer processor unit to control unit channel link, local area network links, a control unit to peripheral devices, tele-communication applications (trunking network or local loops), and cable television applications.

While there have been shown and described and pointed out the fundamental features of the invention as applied to a preferred embodiment, it will be understood that various omissions and substitutions and changes may be made in the form and details of the embodiment by those skilled in the art without departing from the spirit of the invention. It is the intention, therefore, to be limited only as indicated by the scope of the following claims.

What is claimed is:

1. A fiber optic connector system for transmitting input and output signals to and from an integrated circuit module which comprises:
   a connector housing;
   a plurality of optical terminators mounted in said housing, each terminator containing either an input signal or an output signal fiber optic strand;
   a plurality of conical holes in said housing and in alignment with said terminators;
   a substrate having an integrated circuit chip thereon;
   a plurality of light emitting diodes on said chip;
   a wall member integrally connected to said substrate and approximately perpendicularly disposed with respect to said substrate;
   an alignment plate positioned over said chip and having holes in alignment with said diodes;
   a cap attached to the wall member and to the substrate, said cap having an opening;
   a plurality of cones integrally attached to said wall member and partially extending through said opening in said cap, each cone having a fiber optic strand which is connected through said alignment plate to an associated one of said light emitting diodes; and
   latching means for latching the connector housing to the cap, said cones being seated in the conical holes in the connector housing thereby positioning the strands in the terminators in alignment with the strands in the cones, said latching means comprising,
      retention ledges formed on said cap opening and being angularly oriented with respect to said cap opening, and
      a retention housing encompassing said connector housing including latching arms operable to snap into and out of engagement with the angularly oriented retention ledges, the angular orientation of the retention ledges functioning to press the strands in the terminators snugly against the strands in the cones when the latching arms are snapped into engagement with the angularly oriented retention ledges.

2. A fiber optic connector system as defined in claim 1 wherein said latching means comprises retention ledges formed on said cap opening and a retention housing encompassing said connector housing and having latching arms operable to snap into and out of engagement with said retention ledges.

* * * * *